Nov. 19, 1940. P. C. THOMPSON 2,222,577
BATTERY CABLE TERMINAL OR THE LIKE
Filed Nov. 5, 1938
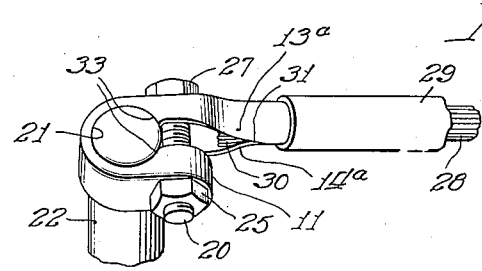
Fig. 1
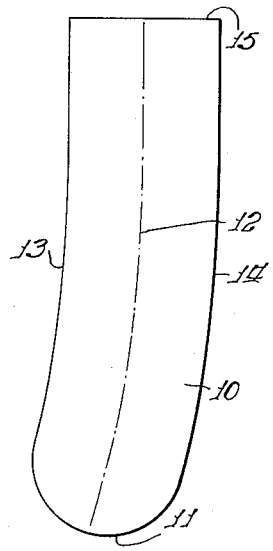
Fig. 2
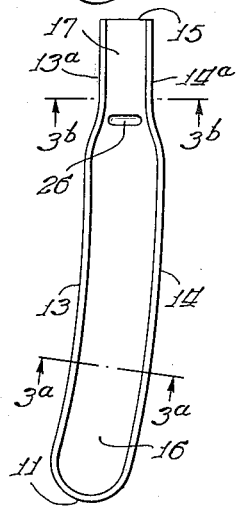
Fig. 3
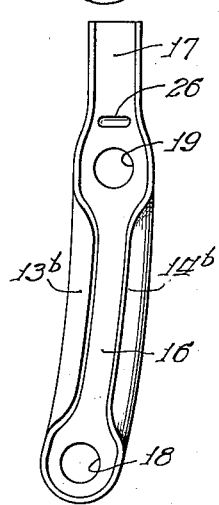
Fig. 4
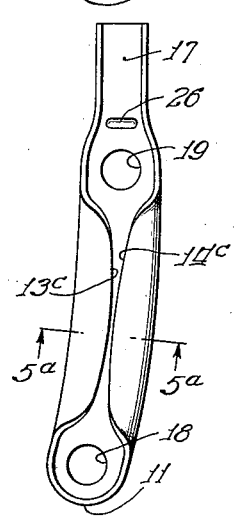
Fig. 5
 
Fig. 3a  Fig. 3b  Fig. 5a
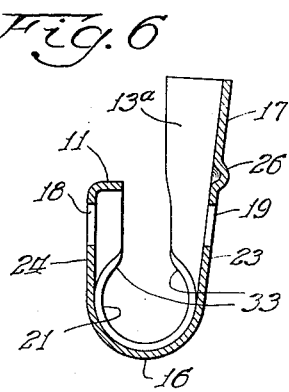
Fig. 6
Inventor:
Parker C. Thompson
By: A. Trevor Jones
Atty.

Patented Nov. 19, 1940

2,222,577

UNITED STATES PATENT OFFICE 2,222,577

BATTERY CABLE TERMINAL OR THE LIKE

Parker C. Thompson, Chicago, Ill., assignor to Thompson-Neaylon Manufacturing Company, Chicago, Ill., a corporation of Illinois Application November 5, 1938, Serial No. 239,050

5 Claims. (Cl. 173—259)

This invention relates to clamp terminals more particularly for electric storage batteries.

An object of the invention is to provide an improved device of this character which can be made in large quantities at low cost, which can be easily applied to or removed from the post of the battery, and which when in place thereon will reduce the susceptibility to corrosion of the parts. My improved device provides, in a unitary integral article, both a post clamping portion and a cable connecting portion.

I have found that by making the device of sheet metal folded upon itself along a longitudinal line and thereafter bent again to strap and jaw form the required strength may be obtained and enhanced resilience effected, while at an actual saving in cost a more conductive and less corrosive material may be employed, such as relatively pure commercial copper.

The enhanced simplicity and efficiency of my improved clamp terminal and the marked feasibility and speed of my novel method of production will be readily apparent to those skilled in the art.

The invention will be understood by reference to the following description of an illustrative form and procedure, taken together with the accompanying drawing, in which—

Figure 1 is a perspective view of my improved terminal, in this instance adapted for and associated with a conventional tapered battery post and showing a portion of an insulated conductor cable connected therewith;

Figure 2 is a plan view of the initial blank for the first step in the production of the device shown in Fig. 1;

Figure 3 is a second step in the production, being a plan view of the blank of Fig. 2 after being partially folded along a longitudinal line;

Figure 3a is a cross-section taken on the line 3a—3a of Fig. 3;

Figure 3b is another cross-section taken on the line 3b—3b of Fig. 3;

Figure 4 is a further intermediate step in the preferred form and showing the perforations for a clamping bolt or the like.

Figure 5 is a similar further step;

Figure 5a is a cross-section taken on the line 5a—5a of Fig. 5; and

Figure 6 is a longitudinal section showing the intermediate blank of Fig. 5 again folded upon itself to strap and jaw form.

Referring in detail to the illustrative construction and procedure shown in the accompany drawing, the blank 10 is preferably formed as a flat stamping from a sheet of relatively pure commercial hard rolled copper. This blank 10 is approximately about four inches long and slightly over an inch wide, and approximately a sixteenth of an inch or less in thickness. For purposes presently described, the blank is rounded at one end as at 11 and is also formed when in the flat upon a curvature in its own plane along its longitudinal center line 12.

As the next step, as shown in Fig. 3, the blank 10 is folded upon itself along the longitudinal center line 12 as by a drawing operation, to somewhat channel form, the edges 11, 13 and 14 of the flat blank being bent at right angles to the body of the blank to change the flat blank to channel form, as shown in cross-section in Fig. 3a, the edge 11 providing a closed end for one end of this channel while the straight edge 15 provides an open end therefor. The closed end 16 of this channelled intermediate blank is to provide a post clamping portion of the clamp terminal, while the open end 17 is to provide a cable connecting portion, as presently described. For this reason, the sides 13 and 14 are brought slightly together at this end as at 13a and 14a. As shown in Fig. 3a, the channel along the portion 16 has a relatively flat bottom 16a, whereas as shown in Fig. 3b the channel along the portion 17 has a more sharply curved bottom 17a which permits the edges 13 and 14 where formed as at 13a and 14a to project above the level of these edges at other points in the blank.

As a next step, as shown in Fig. 4, at intermediate portions of the part 16 and edges 13 and 14, these edges are brought still further closer together as at 13b and 14b, and the round perforations 18 and 19 are punched in the trough of the channel at points spaced apart by the further intermedially folded edges 13 and 14 (where further folded as already referred to as at 13b and 14b), the perforation 18 being made adjacent the rounded end 11 and the perforation 19 adjacent the cable connecting portion 17.

As a still further step or as a continuation of the step shown in Fig. 4, the intermediate portions of the edges 13 and 14 are folded together still further as at 13c and 14c, and desirably substantially into a common plane which contiguously laps the plane of the bottom 16a of the channel, as shown in cross-section in Fig. 5a, while leaving the edges 11 and 13 and 14 in the vicinity of the perforations 18 and 19 substantially as formed in the step of Fig. 4. Thus there is provided a cup-shape form for the device at the places where the clamping bolt 20 passes through the perforations, as best shown in Figs. 1 and 6, while having a laminated structure therebetween.

As a next step, as shown in Figs. 1 and 6, the heretofore described folded blank in its final intermediate form of Fig. 5 is again bent upon itself to loop-like strap and jaw form, and in this instance with the longitudinal edges 13 and 14 at the inside of the jaws. As will be best seen in Fig. 6, the edges 13 and 14 where folded as at 13c and 14c provide the somewhat circular recess 21 and strap portion for the reception of the battery post 22. By reason of the curvature of the blank initially along the curved longitudinal center line 12, this recess 21 is tapered axially of the terminals so as to adapt itself to the outwardly slight diminishing taper which is commonly found in such battery posts.

The body 16 is desirably of uniform width throughout both the strap and jaw portions of the terminal and has reinforcing flanges throughout, longitudinal free edge portions 13 and 14 being flanged inwardly of the body at different angles, said edge flanged portions at said strap part lying against the face of the body substantially parallel therewith and at said jaws being substantially normal, i. e., at right-angles to the body. It will be also noted that as so constructed, the perforated outer sides of the jaws are aligned respectively substantially tangent to the strap part while the flanged free edge portions upon the inner face of the terminal gradually and continuously merge from where bent to form the jaws to where bent to form the strap part, thus enhancing the strength of the terminal.

In this instance, and in the representative means for clamping the jaws together, the clamping bolt 20 is inserted first through the perforation 19 in the jaw 23 and then through the perforation 18 in the jaw 24 whereupon the nut 25 is threaded upon the shank of the bolt and may be suitably tightened to provide the required clamping pressure, the strap and jaws being drawn together about the battery post to securely grip the post.

At some step in the process and in this instance as shown in the step of Fig. 3, the blank has a narrow transverse lug 26 outwardly extruded from the channel of the blank to form a shoulder adjacent the perforation 19 which abuts one of the facets on the head 27 of the bolt and prevents turning of the bolt while the nut 25 is being tightened.

Generally, prior to such clamping of the terminal, it will be understood that the conductor cable 28, having the insulating covering such as 29, has its end 30 bared to be received in the connecting portion 17 of the clamp blank, and the sides 13 and 14 where formed as at 13a and 14a, are further bent to meet as at 31 about the end 30 of the cable 28, and these parts may be soldered together in accordance with common practice. The substantially complete closing of the reduced end 17 of the blank about the cable permits this end to assume a cylindrical tubular shape which fits snugly into the end of the insulation 29 between this insulation and the cable 28 itself, thus minimizing the length of cable which must be bared at 30. Also, as will be readily understood to those skilled in the art, the connector end 17 of the terminal may be readily formed to adapt itself either to an uninsulated cable or to a flattened cable.

As so constructed and arranged, the device has great strength and relatively less flexibility in the vicinity of the clamping bolt 20, whereas the flexibility is desirably somewhat greater in the vicinity of the strap recess 21 for the battery post. It will be noted that the cup-shape or U shape cross-section of the clamp which the clamping bolt passes through, with the troughs of the U facing toward each other along the bolt contiguously adjacent the battery post as at 33, provides a truss-like or beam effect, which enhances both the strength and resilience of the clamp. Thus there may be effected by tightening of the bolt 20 a very close fit with the battery post which enhances both the mechanical and electrical connection of the terminal with the post and minimizes the voltage-drop therebetween. Along with these desirable characteristics, the relatively greater resilience of the jaw parts 23 and 24 results in the desirable characteristic of the terminal that when the clamping bolt is released, the jaws tend to spring apart and to break themselves away from the battery post, thus aiding removal when desired.

Furthermore, the terminal shown as here made weighs little more than one ounce, as against a weight of approximately two and three-quarters ounces for the conventional cast brass terminal, or four and one-half ounces for the conventional cast lead terminal. Along with this reduction in weight, my improved terminal has at the same time greater electrical capacity and resistance to corrosion due, at least in part, to the density of the hard rolled copper as against the relative porosity of a brass casting, for example, and also it is well known that a rolled metal is less subject to cracking or fracturing than a casting. Furthermore, it is believed that galvanic and electrolytic action between the metal of the terminal and the metal of the battery post is minimized by the absence of the usual alloys which are present in a cast terminal.

A distinct advantage of my improved terminal is the fact that it has the characteristics necessary for a successful automotive battery terminal combined with the fact that the cable is in a substantially continuous line with the shank of the terminal and with the center of the battery post, and also the fact that the clamping bolt is between the post and the end of the cable. It has been found that this effects a substantial reduction in length of cable required for the average automotive installation, saving approximately one-half inch per cable. That this is an important item will be seen when it is realized that the great majority of automotive battery cables are from six inches to thirty inches long, and the saving in length results in a saving in weight of cable required which, plus the saving due to the weight of the lighter terminal itself, has been found to amount to as much as two hundred pounds per one thousand cables equipped with my improved terminal. As these units are produced in large quantities and sold at a low price, the resulting saving in freight is important.

It will be understood that the invention is not limited to details of construction and precise character or sequence of steps here illustrated.

Having described my invention, I claim—

1. A sheet metal clamp terminal embodying a strap part of flexible loop-like form and a pair of integral opposed less flexible clamping jaws having aligned bolt perforations therein at the ends respectively of said strap part, said terminal comprising a body and reinforcing flanges throughout the body, longitudinal free edge portions thereof being flanged inwardly of the body at different angles with respect to said body, said edge flanged portions at said strap part lying against the face of the body substantially parallel therewith whereby to cause the said strap part to be of laminated form and at said jaws being substantially normal to the said body whereby to cause the jaws to be cup-shape with their interiors facing each other and with their perforated outer sides aligned respectively substantially tangent to the strap part.

2. A one-piece sheet metal clamp terminal embodying a strap part of flexible loop-like form and a pair of integral opposed less flexible clamping jaws having aligned bolt perforations therein at the ends respectively of said strap part, said terminal comprising a body and reinforcing flanges on the body at both the strap part and jaws, longitudinal free edge portions thereof being flanged inwardly of the body at different angles with respect to said body, said edge flanged portions at said strap lying against the face of the body substantially parallel therewith and at said jaws being substantially normal to the said body whereby to cause the jaws to be cup-shaped with their interiors facing each other and with their perforated outer sides aligned respectively substantially tangent to the strap part, one of said jaws being extended longitudinally to form an integral cable-embracing portion.

3. A sheet metal clamp terminal embodying a strap part of flexible loop-like form and a pair of integral opposed less flexible clamping jaws at the ends respectively of said strap part, said terminal comprising a body of uniform width and having reinforcing flanges substantially throughout, longitudinal free edge portions thereof being flanged at different angles with respect to the body, said edge flanged portions at said strap part lying against the face of the body substantially parallel therewith and at said jaws being substantially normal to the said body whereby to cause the jaws to be cup-shape.

4. A resilient copper metal clamp terminal embodying a strap part of flexible loop-like form and a pair of integral opposed less flexible clamping jaws having aligned bolt perforations therein at the ends respectively of said strap part, said terminal comprising a body and reinforcing flanges on the body at both the strap part and jaws, longitudinal free edge portions thereof being flanged inwardly of the body at different angles with respect to said body, said edge flanged portions at said strap lying against the face of the body substantially parallel therewith and at said jaws being substantially normal to the said body whereby to cause the jaws to be cup-shape with their interiors facing each other and with their perforated outer sides aligned respectively substantially tangent to the strap part, one of said jaws being extended longitudinally to form an integral cable-embracing portion, said last mentioned jaw having an integral lug bulged outwardly thereof adjacent the cable-embracing portion to prevent turning of a clamping bolt received through said perforations, and the other of said jaws being flanged inwardly across its end merging into said longitudinal edge flanged portions to close said end.

5. A sheet metal clamp terminal embodying an initially elongated sheet slightly arcuate in its own plane when in the flat bent upon itself forming a body and reinforcing longitudinal free edge portions bent from the body and approaching each other adjacent a longitudinal center line of the sheet, the sheet so bent being also turned upon itself in the direction of said bends to form a strap part and a pair of integral opposed clamping jaws, said longitudinal free edge portions at said strap part lying against the inner face of the body to cause the strap to be of laminated form and at said jaws extending toward the opposite jaw to cause the jaws to be cup-shape, the said free edge portions gradually and continuously merging from where bent to form the jaws to where bent to form the strap part whereby the strap part is somewhat loop-like to receive a tapered battery post, and said jaws having aligned bolt perforations therein to receive a clamping member for clamping the terminal to the post.

PARKER C. THOMPSON.